(12) United States Patent
Gugerli et al.

(10) Patent No.: US 9,307,859 B2
(45) Date of Patent: *Apr. 12, 2016

(54) DEVICE AND METHOD FOR PRODUCING A FROTHED LIQUID FROM SOLUBLE INGREDIENTS AND DILUENT

(71) Applicant: NESTEC S.A., Vevey (CH)

(72) Inventors: Raphael Gugerli, Genolier (CH); Jean-Luc Thuliez, Le Landeron (CH); Iwan Kissling, Bienne (CH); Raphael Bernhardsgruetter, St. Gallen (CH); Cedric Beausire, Bavois (CH); Nihan Dogan, La Croix-sur-Lutry (CH); David J. Harrison, New Milford, CT (US); David Hamel, Chemex (CH)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,823

(22) Filed: Jan. 21, 2015

(65) Prior Publication Data

US 2015/0128812 A1 May 14, 2015

Related U.S. Application Data

(63) Continuation of application No. 12/518,675, filed as application No. PCT/EP2007/063391 on Dec. 6, 2007, now Pat. No. 8,960,079.

(30) Foreign Application Priority Data

Dec. 11, 2006 (EP) ..................................... 06125772

(51) Int. Cl.
*A23F 3/00* (2006.01)
*A47G 19/14* (2006.01)
(Continued)

(52) U.S. Cl.
CPC .................. *A47J 31/46* (2013.01); *A23F 5/262* (2013.01); *A23L 2/54* (2013.01); *A47J 31/401* (2013.01);
(Continued)

(58) Field of Classification Search
CPC ...... A47J 31/401; A47J 31/402; A47J 31/404; A47J 31/405
USPC ............. 99/323, 323.1, 323.3, 279, 293, 294, 99/295; 426/474, 477, 590–597
See application file for complete search history.

(56) References Cited

U.S. PATENT DOCUMENTS

| 2,522,102 A | 9/1950 | Dold |
| 3,212,757 A | 10/1965 | Martin |

(Continued)

FOREIGN PATENT DOCUMENTS

| EP | 0449533 | 10/1991 |
| EP | 0885580 | 12/1998 |

(Continued)

OTHER PUBLICATIONS

International Search Report for International Application No. PCT/EP2007/063391 mailed on Mar. 4, 2008.
(Continued)

*Primary Examiner* — Tu B Hoang
*Assistant Examiner* — Alba Rosario-Aponte
(74) *Attorney, Agent, or Firm* — K&L Gates LLP

(57) ABSTRACT

Device for producing a frothed liquid comprising a chamber opened to atmosphere with a transverse bottom wall and a longitudinal upward wall, at least one diluent inlet, at least one liquid delivery outlet. The at least one diluent inlet comprises a first diluent inlet provided through the upward wall and dimensioned and oriented for directing a thin jet of diluent in the chamber. The at least one liquid delivery outlet is configured in the bottom wall for liquid to rise up along the side of the upward wall by the jet of diluent entering the chamber as a result of the direction and dimension of the diluent inlet in the chamber.

19 Claims, 12 Drawing Sheets

(51) Int. Cl.
*A47J 31/46* (2006.01)
*A47J 31/40* (2006.01)
*A23F 5/26* (2006.01)
*A23L 2/54* (2006.01)
*B65D 85/804* (2006.01)

(52) U.S. Cl.
CPC ............. *A47J 31/404* (2013.01); *A47J 31/407* (2013.01); *A47J 31/462* (2013.01); *B65D 85/8043* (2013.01); *A23V 2002/00* (2013.01)

(56) References Cited

U.S. PATENT DOCUMENTS

| | | | |
|---|---|---|---|
| 3,300,094 | A | 1/1967 | Rockola |
| 3,446,399 | A | 5/1969 | Ross et al. |
| 3,782,695 | A | 1/1974 | Sandiford |
| 3,844,447 | A | 10/1974 | Marsberg |
| 4,193,511 | A | 3/1980 | Taber |
| 4,193,522 | A | 3/1980 | Edelbach |
| 4,493,249 | A * | 1/1985 | Stover ................... A47J 31/401 222/129.2 |
| 4,859,072 | A | 8/1989 | Fey et al. |
| 4,921,712 | A | 5/1990 | Malmquist |
| 4,978,833 | A | 12/1990 | Knepler |
| 6,155,158 | A | 12/2000 | Anson |
| 6,267,496 | B1 * | 7/2001 | Real ...................... A47J 31/401 222/56 |
| 7,762,180 | B2 | 7/2010 | Brouwer et al. |
| 8,960,079 | B2 * | 2/2015 | Gugerli ................. A47J 31/401 99/275 |
| 2004/0031393 | A1 | 2/2004 | de Bruin et al. |
| 2004/0118291 | A1 | 6/2004 | Carhuff et al. |
| 2005/0155494 | A1 | 7/2005 | Brouwer et al. |
| 2006/0034987 | A1 * | 2/2006 | Thakur ................... A23F 5/405 426/477 |
| 2007/0068393 | A1 | 3/2007 | Nosler et al. |
| 2007/0144355 | A1 * | 6/2007 | Denisart ............. A47J 31/3695 99/275 |
| 2008/0245239 | A1 * | 10/2008 | Fischer ................... A47J 43/12 99/323.3 |
| 2010/0154645 | A1 * | 6/2010 | Nosler ................... A47J 31/007 99/281 |

FOREIGN PATENT DOCUMENTS

| | | |
|---|---|---|
| EP | 1510159 | 3/2005 |
| EP | 1639924 | 3/2006 |
| EP | 1932457 | 8/2008 |
| EP | 06125772 | 11/2013 |
| JP | 05048085 | 6/1993 |
| JP | 11-318714 | 11/1999 |
| JP | 2004-508079 | 3/2004 |
| JP | 2004-528143 | 9/2004 |
| JP | 2005-529663 | 10/2005 |
| NL | 1029155 | 4/2006 |
| TW | 200513220 | 4/2007 |
| WO | 0219877 | 3/2002 |
| WO | 02/087400 | 11/2002 |
| WO | 02100224 | 12/2002 |
| WO | 03/068039 | 8/2003 |
| WO | 2005/020769 | 3/2005 |
| WO | 2006015689 | 2/2006 |
| WO | 2006043808 | 4/2006 |
| WO | 2008071613 | 6/2008 |

OTHER PUBLICATIONS

Written Opinion for International Application No. PCT/EP2007/063391 mailed on Mar. 4, 2008.

* cited by examiner

DEVICE AND METHOD FOR PRODUCING A FROTHED LIQUID FROM SOLUBLE INGREDIENTS AND DILUENT

PRIORITY CLAIM

This application is a continuation of U.S. application Ser. No. 12/518,675, filed Jan. 19, 2010, which is a U.S. national stage filing of International Appl. PCT/EP07/063391, filed on Dec. 6, 2007, which claims priority to European Patent Application No. 06125772.1, filed Dec. 11, 2006, the entire contents of which are being incorporated herein by reference.

FIELD OF THE INVENTION

The invention relates to a device for producing a frothed liquid in a chamber opened to the atmospheric pressure in particular using a jet of diluent to dissolve soluble ingredient or liquid concentrate and froth it into a frothed liquid. The invention further relates to a beverage production apparatus comprising such a device. The invention also relates to a method for dissolving a powder and producing a frothed liquid using a jet of diluent to dissolve soluble ingredient and froth it into a frothed liquid.

BACKGROUND

Beverage production apparatuses exist for producing frothed beverage liquids that utilize a diluent for dissolving a soluble ingredient such as coffee powder. The known systems typically utilize a mechanical high-speed rotating element such as a whipper to produce shear forces in the liquid enabling to properly dissolve the powder and produce a satisfying amount of froth.

For instance, patent applications WO 03/068039 and EP 1 639 924 relate to rotary mechanical solutions to improve frothing of liquid from a mixture of soluble ingredients and diluent.

These solutions have disadvantages in that they are noisy, involve a higher mechanical complexity and additional production costs with the need for a propelling element such as an electrical motor. Such a solution requires also more frequent cleaning or rinsing.

Therefore, these solutions using pressure prove to be not very appropriate for making a performing, low cost, noiseless and hygienic beverage producing apparatus adapted in particular for the retail channel like household small coffee appliances.

Whipperless solutions exist to provide a frothed liquid from soluble ingredient, in particular, in portioned packages such as capsules or pods. Typically, in these known solutions, a diluent is injected under pressure in a substantially closed chamber and is forced under pressure to pass through a perforated membrane or a filter to create a pressure drop and shear forces to form the frothed liquid. Although these solutions are working perfectly well, they are also complex and costly to implement because of the need to ensure a pressure tight chamber during brewing or dissolution of the ingredient. Furthermore, beverage systems using portioned packages have the disadvantage to produce packaging wastes.

For instance, WO 2005/020769 A1 relates to a method and device for the preparation of a food product by injection of a liquid through a capsule containing a food substance which is soluble and/or for extraction, whereby the liquid is injected from at least one injection point such as to generate a turbulent movement of injected liquid within the capsule thus causing brewing. As mentioned, this solution requires the capsule to be entirely filled with water until a certain pressure is built up inside the capsule in order for the diluent and beverage substance to mix together and provide a frothed beverage. Another issue is that the capsule remains full of liquid when the pressure in the capsule drops. Therefore, entire draining of the capsule is not possible.

WO 02/087400 relates to a method for preparation of a foamed drink comprising a capsule containing a foamable ingredient, providing a receptacle positioned to collect fluid escaping from the capsule, injecting liquid into the capsule to mix with the foamable ingredient, allowing the foamable ingredient mixed with the liquid to escape from the capsule into the receptacle; followed by injecting further the liquid into the receptacle in a jet having a diameter of from about 0.5 to 2 mm to produce a foamed liquid in the receptacle. However, this method has the disadvantage to require two distinct foaming steps performed respectively in the capsule and in a receptacle.

There is a need for a simpler, hygienic, and low cost solution enabling to produce a frothed liquid from the combination of a diluent and soluble ingredient or liquid concentrate and without involving the use of a pressurized chamber or motor-driven whipping means and without providing solid residues.

SUMMARY

The invention is based on a device comprising a chamber opened to atmospheric pressure wherein a combination of at least one jet of diluent and liquid outlet means is configured in such a manner that surfaces of circulating liquid in the chamber are submitted to high shear forces effective to dissolve a powder and produce a frothed liquid.

The result of the froth created by the device is even improved compared to mechanical whipping devices and at least comparable to pressure capsule system, however, without having the aforementioned disadvantages of any of these systems.

More particularly, the device of the invention comprises a chamber opened to atmosphere with a transverse bottom wall and a longitudinal upward wall, at least one diluent inlet and at least one liquid delivery outlet, wherein the diluent inlet is provided through the upward wall and is dimensioned and oriented for directing a jet of diluent in the chamber and the at least one liquid delivery outlet is configured in the bottom wall for enabling liquid to rise up along the side of the upward wall by the jet of diluent entering the chamber as a result of the direction and dimension of the diluent inlet in the chamber.

Therefore, according to the general principle of the invention, the chamber is designed in such a way that a layer of circulating liquid is produced that rises up along the side of the upward wall; forming a liquid surface which is submitted to important shear forces from at least one jet of diluent. A second surface of liquid can also be produced along the bottom of the chamber which is also submitted to shear forces from the jet of diluent. The layer of circulating liquid is mainly obtained by controlling the liquid flow exiting the chamber to maintain a sufficient volume of liquid in the chamber and by the configuration of the diluent inlet which must properly impact on the liquid to make it swirled and to froth it. The liquid delivery outlet(s) and the direction and the dimension of the diluent inlet are configured for enabling liquid to rise up along the side of the upward wall.

According to the invention, the diluent can be any suitable liquid adapted for dissolving a food soluble ingredient using the features and conditions of the device. A preferred diluent is hot water but other diluents such as cold water or other aqueous liquids can be utilized such as liquid milk.

The soluble ingredient can be any foamable food ingredient that dissolves and performs to produce a foamed liquid using the features and conditions of the device of the invention. A preferred ingredient is soluble coffee powder. However, other ingredients can be used in the device of the invention to provide foamed liquid such as soluble tea, dehydrated culinary ingredients and/or milk based ingredients. The device and the method of the present invention are applicable too to the dissolution and frothing of liquid concentrates with a diluent. Such liquid concentrates may be coffee, chocolate or milk concentrates.

According to the invention, the bottom wall comprises one liquid outlet or a plurality of liquid outlets. More particularly, the total surface area of the outlet(s) is determined so that the evacuation flow rate by gravity of the liquid through the outlet(s) is lower than the filling flow rate of the chamber in diluent through the diluent inlet. By lower, it is meant that the evacuation flow rate is inferior or equal to the filling flow rate. Of course, the slower evacuation of the chamber takes into account the dynamic of the fluid in the chamber. For instance, fluid can be less prone to evacuate when being maintained in a swirl motion along the side of the chamber. As a result of this configuration, a layer of liquid can be maintained in circulation in the chamber to be collided by the jet of diluent entering the chamber at least as long as diluent enters the chamber. Preferably, the outlet or plurality of outlets are in majority localized at or immediately close to the centre of the bottom wall. This configuration participates to slowing down the evacuation of the liquid out of the device. In a preferred arrangement of the device, the total cross-section of the liquid outlet is sufficiently small as to retain sufficient liquid in the chamber when diluent enters the chamber but does still provide an effective draining of the chamber by simple gravity effect. Preferably, the upward wall is substantially vertical to promote liquid draining. The device has proved to be self-cleaning in the sense that substantially no foam solid or foam residue is left in the chamber after operation. The diluent can rinse the inner surfaces of the chamber and liquid or solids residue can evacuate entirely to the outlet(s). Indeed, it is important to be able to fully drain and rinse the chamber in order to keep it clean and avoid hygiene issues. Preferably, the cross-section of a single liquid outlet is smaller than 12.6 $mm^2$. The cross section of each liquid outlet in a configuration involving a plurality of outlets in the bottom wall is smaller than about 2 $mm^2$, most preferably smaller than 1.54 $mm^2$. It can be noticed that the cross section of the outlets is also dependent of the cross section and volume of the chamber. The relation between the cross sections is determined to ensure a control of the liquid inside the device enabling a proper dissolution and frothing by the jet of diluent.

The chamber may have a diameter of from 15 to 45 mm, more preferably of from 25 to 36 mm for office beverage systems of relatively small size. Even larger chambers can be envisaged for example for beverage machines offering greater delivery capacity.

In a possible alternative, a manner to maintain liquid in the chamber according to the principle of the invention, can be carried out by the bottom wall which comprises at least one liquid outlet selectively closed by an openable valve. The valve maintains the chamber closed for allowing the level of liquid to rise in the chamber and for delaying sufficiently the liquid delivery from the outlets. The valve is preferably opened using external control means. The valve can be selectively opened after a time delay from the start of the jet of diluent.

In order to obtain a jet of diluent that reaches a sufficient velocity and therefore sufficient kinetic energy providing high shear forces on the surface of the liquid, the diluent inlet has preferably a diameter of from about 0.2 to 1.0 mm, more preferably of from 0.3 to 0.8 mm, even more preferably of from 0.4 to 0.6 mm. The diameter of the diluent inlet is generally defined according to the diameter of the chamber.

Another feature of the diluent inlet relates to the direction of the inlet in the chamber to properly orient the jet of diluent towards the surfaces of liquid. Concerning the configuration of the diluent inlet for properly impacting on the surfaces of liquid, the diluent inlet is preferably oriented along a direction inside the chamber which is offset relative to the longitudinal central axis of the chamber. More specifically, the diluent inlet is oriented in a direction so that a ratio "d/r" is comprised between 0.2 and 0.9, where "r" is the radius of the chamber and "d" is the distance measured orthogonally from the direction of orientation of the inlet to the central axis of the chamber. Furthermore, the diluent inlet is inclined downwardly a certain angle relative to the transversal plane of the chamber. Preferably, this angle is of from 5 to 30 degrees. Therefore, the inlet diluent can be properly oriented toward the surfaces of liquid that circulates in the chamber. The transversal plane of the chamber is normally orthogonal to the longitudinal direction of the chamber which is thus preferably positioned vertically to obtain a good liquid evacuation of the chamber under the effect of gravity.

According to a specific mode, the device of the invention can comprise two diluent inlets placed at different heights of the chamber upward wall. The second diluent inlet placed at a nearer distance from the top of the chamber does not have to present the same specific features of dimension and orientation as the other bottom diluent inlet because its function is not to froth the liquid but just to add diluent. These two diluent inlets are usually placed one above the other through the upward wall to facilitate the connection with diluent feed means.

The chamber can take various shapes. In a preferred mode, the longitudinal upward wall is substantially cylindrical. The wall is such that its longitudinal distance (or height) is longer than its diameter (or width) in order to ensure that liquid does not flow over the chamber when being impacted and circulated by effect of the jet of diluent. Other shapes could be envisaged such as a polygonal, e.g., hexagonal, or oval section of the chamber, for instance. The bottom wall can be substantially a portion of truncated cone. This shape enables to improve the distribution of liquid in a layer which rises along the upward wall of the chamber as a result of the centrifugal effect on the liquid, imparted by the diluent jet.

The chamber comprises a large upwardly oriented aperture which permits air to enter the chamber and eventually to meter soluble ingredient in the chamber. For instance, the chamber is not closed by a lid but the upward wall terminates with free upper ends. For instance, the large upper aperture can have the form of a funnel that widens upwardly or be a straight extension of the upward wall.

A plurality of radial wings can be provided in the bottom wall for slowing the liquid down before exiting the chamber through the outlet(s). A lower velocity of the liquid exiting the chamber enables to provide a smooth liquid delivery and avoids too much splashing at the delivery side of the device.

The device of the present invention can comprise at least one baffle means placed at least partially across the chamber. According to a first mode these baffle means can be placed above the diluent inlet. Such baffles prevent the liquid to rise too much in the chamber and overflow the chamber via the top aperture. The baffle means can be configured in shape, position and number in the chamber to break the speed of the liquid at a level above the diluent inlet. In one variant, a single baffle is provided in the form of a wall crossing the chamber. Usually this wall is essentially vertically oriented. In another possible variant, a plurality of baffles is provided which are vertically oriented along and/or inclined relative to the longitudinal central axis. These baffles can also be of shorter length than the diameter of the chamber. Therefore, the baffles can extend all through the diameter of the chamber or only partly across the chamber. According to this first mode, the baffle means are preferably full and do not present orifices.

According to a second preferred mode, the baffle means face the diluent inlet. Preferably these baffle means are placed totally across the chamber and comprise orifices. Such baffle means can be a plate with orifices or preferably a sieve, which sieve preferably presents a number of eyes per $cm^2$ comprised between 50 and 100. The eyes in the sieve can be of any form. Sieves presenting square or rectangular eyes are the most usual. The baffle means can present any orientation inside the chamber except that they must be hit by the diluent jet and preferably crossed by the diluent jet if they comprise orifices. Preferably the baffle means are vertically oriented. According to a specific variant, they are substantially orthogonal to the direction of the diluent jet; by substantially orthogonal to the direction of the diluent jet, it is meant that the horizontal projections of the longitudinal axis of the baffle means and the longitudinal axis of the diluent inlet are orthogonal. Thus, the diluent jet emerging from the diluent inlet hits these baffle means which has the effects of simultaneously breaking the force and speed of the diluent jet so as to avoid it to splash out of the chamber and also to create shear forces on the liquid improving dissolution of powder or liquid concentrate and producing foam. According to a specific variant of this second preferred mode, the device can comprise two diluent inlets placed at different heights of the chamber upward wall, the first one being placed faced to the baffle means as mentioned above and the second one being placed above said baffle means. In this variant, the baffle means are preferably placed totally across the chamber and comprise orifices and are even more preferably a sieve such as described above. The first diluent inlet placed near the bottom of the chamber aims at solving the problem of the present invention of frothing liquid, whereas the second diluent inlet placed near the top of the chamber aims at simply introducing the diluent in the case the chamber would be used for producing a beverage with no foam.

According to a variant of the invention, the chamber can comprise a conduit placed at the top of the chamber, said conduit providing a liquid outlet allowing liquid to exit the chamber after the liquid has exceeded the chamber capacity. The liquid outlet is usually placed under the top edge of the chamber and the conduit is adjoined to the exterior surface of the chamber.

The device of the invention can be installed as a mixing and frothing part of a beverage production apparatus. The beverage production apparatus is thus configured with diluent feed means which is connectable to the diluent inlet. The connection can be permanent or removable for cleaning or rinsing.

The beverage production apparatus can comprise a powder dosing unit placed above the dosing opening of the device to feed the device with powder. The dosing unit can be associated to a powder dosing reservoir. Feeding by the powder dosing unit can be automatically controlled without handling of the powder. In an other mode, the dosing unit can be associated to a liquid concentrate reservoir.

In a possible mode, the device forms a disposable or recyclable cartridge which contains an amount of soluble ingredient. The cartridge is pre-filled with a dose of ingredient and can be made impervious to gas for preserving freshness of the ingredient. For instance, the capsule is made of injection moulded plastic and its diluent inlet and air aperture are sealed by at least one airtight removable membrane.

The invention further relates a method for producing a frothed liquid in a beverage production apparatus comprising:
  providing a chamber with a transverse bottom wall and a longitudinal upward wall, —dosing the chamber with soluble ingredient,
  feeding a diluent through the diluent inlet to create a jet of diluent in the chamber and mix the diluent with said soluble ingredient to dissolve it into a liquid,
  controlling the liquid flow delivered out of the chamber in such a manner that the liquid can rise a certain level up along the side of the upward wall when diluent is fed in the chamber and for the liquid to form a sheared surface of liquid which is energetically impacted, as a result of the direction of the diluent inlet in the chamber, by the jet of diluent,
  stopping the diluent intake inside the chamber and draining the frothed liquid from the chamber through at least one outlet.

When the soluble ingredient is a powder, the slower evacuation of the chamber can be also partially the result of the presence of coffee powder above the outlet(s) of the chamber.

According to the preferred method, it further comprises controlling the liquid flow delivered out of the chamber by delaying the liquid flow out of the chamber relative to the intake of diluent inside the chamber. This result can be reinforced by the presence of soluble ingredient on the outlet(s) of the chamber.

Furthermore the method comprises feeding the diluent in the chamber by passing the diluent through a diluent inlet and orienting the diluent jet in a direction inside the chamber which is offset relative to the longitudinal central axis of the chamber. According to the preferred method of the present invention, the oriented diluent jet is thrown through a sieve placed across the chamber.

The present method is especially applicable to the preparation of coffee based on soluble coffee ingredient: the method comprises then the step of dosing the coffee ingredient in the chamber.

The method of the invention may further comprise rinsing of the chamber by passing diluent through the diluent inlet after draining of the frothed liquid in the chamber and further draining the rinsing liquid. Therefore, the device can be fully rinsed so that no solid residue such as non-fully solubilised coffee solid or foam residues are left in the chamber.

Specific embodiments of the present invention will now be described further, by way of example, with reference to the accompanying drawings, in which:

DETAILED DESCRIPTION

Figure 1:
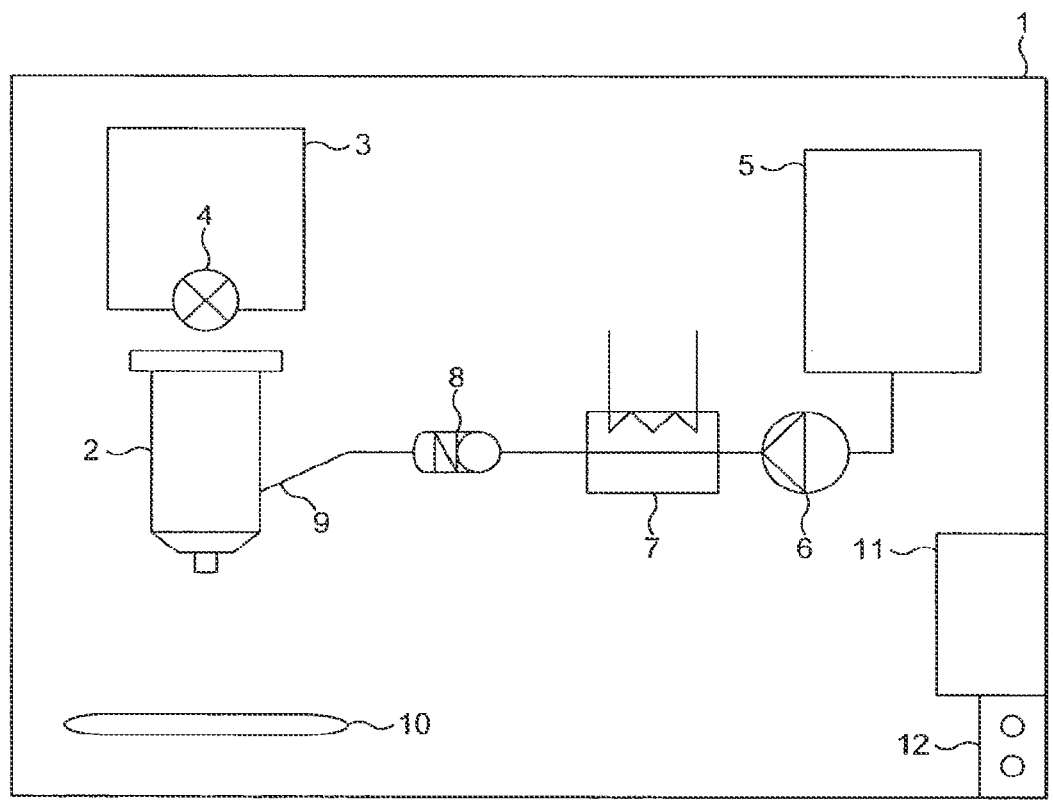
FIG. 1 is a schematic view of a beverage production device comprising a device according to the invention.

Referring to FIG. 1, a beverage production apparatus 1 is represented that includes a device 2 of the invention for producing a frothed liquid from ingredient and a diluent entering the device. The device of the invention will be called "mixing and frothing device" or simply "device" in the rest of the description.

The beverage production apparatus comprises a reservoir of soluble ingredient 3 placed above the device which is coupled with a dosing system 4. The dosing system has the primary function to meter upon request doses of ingredient into the mixing and frothing device. The reservoir can be a hopper which is permanent or a disposable package containing the soluble ingredient. The dosing system can be any suitable system such as a dosing screw or a reciprocating dosing piston. The dosing technology is also of course dependent on the nature of the soluble ingredient. The soluble ingredient is typically a dry food powder. However, it could also be a liquid concentrate. The device is fed upon request with ingredient manually or automatically as prompted by a controller 11 and command 12. One can notice that the reservoir and dosing system are optional in the apparatus. Therefore, the device could be fed manually using a scoop, for instance.

A diluent feed circuit is provided in the apparatus to be able to feed the mixing and frothing device 2 with diluent, more particularly, hot water. For that, a water reservoir 5 is provided that can be replenished with fresh water. A water pump 6 transports the diluent from the reservoir 5 to a water heating system 7 such as a thermoblock or a cartridge type heater and to eventually a non-return valve 8. The pump can be any type of pump such as a piston pump, diaphragm pump or a peristaltic pump. Finally water is fed into the device by a tube means 9.

As illustrated in FIG. 1, the mixing and frothing device can be placed directly above a service tray 10 onto which is placed a receptacle to receive the frothed liquid.

A controller 11 can be further provided to coordinate dosing of the soluble ingredient by the dosing system 4 and diluent by the pump 6 upon the user actuating or being prompted to press a command 12 on the apparatus.

Figure 2:
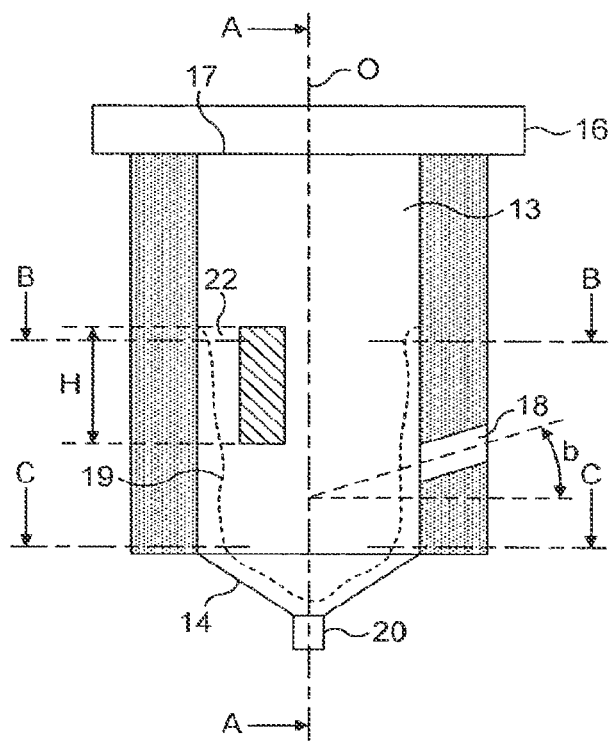
FIG. 2 is a cross sectional view along a longitudinal plane D passing through the diluent inlet (plane D is illustrated on FIG. 4)
Figure 3:
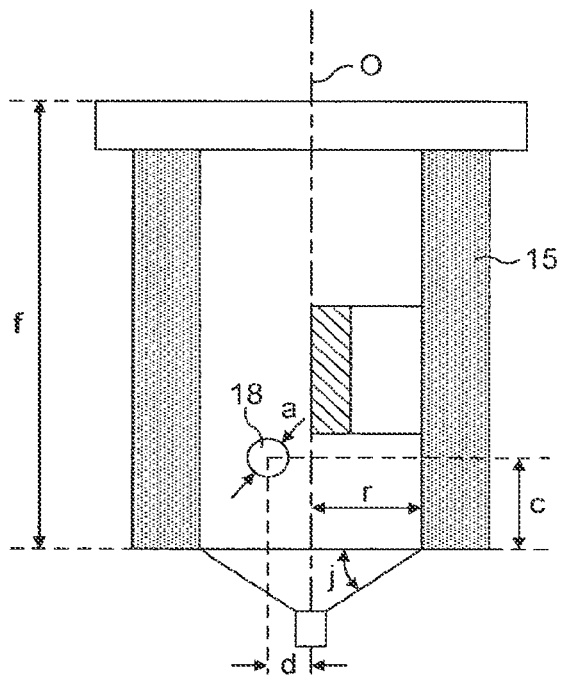
FIG. 3 is another longitudinal cross sectional view along a longitudinal plane A of FIG. 2.

Referring to FIGS. 2 and 3, a mixing and frothing device of the invention is shown in greater detail. The device comprises a chamber 13 which is demarcated by a bottom wall 14 and a side wall 15 extending upwardly and terminating by a flange wall 16 ensuring mechanical gripping in the apparatus and surrounding a large upper central opening 17. The central opening 17 allows the chamber to be fed with soluble ingredient being dropped in either by the dosing system of the beverage production apparatus or manually by a metering utensil. In order for the ingredient to fall directly in the chamber, the surface of the upward wall 15 is preferably smooth and relatively vertical although a slight inclination relative to vertical is conceivable. The central opening 17 also serves as an air inlet for allowing air to enter the chamber and mix with the frothed liquid being created.

The chamber can have diameter of from about 15 to 45 mm, more preferably of from 25 to 36 mm. In order for the liquid to circulate properly in the chamber while avoiding any risk of liquid overflowing the chamber through the upper opening, preference is also given for a chamber which has a diameter-to-height ratio comprised between 1:2 and 1:10, most preferably, between 1:2.5 and 1:5, wherein the height is the distance "f" of the upward wall.

Diluent is fed at relatively high velocity into the chamber by a diluent inlet 18. According to an important aspect of the invention, the diluent inlet is placed through the upward wall 15. The inlet is sized and oriented in a manner to promote both centrifugal circulation of the liquid and shearing on the surfaces of the liquid. The result is a liquid being frothed in a short amount of time.

For that, the inlet 18 forms a nozzle of small diameter enabling to create a jet with high linear velocity in the chamber. Preferably the diameter "a" of the inlet ranges of from 0.3 to 0.8 mm, most preferably between 0.4 and 0.6 mm. The flow rate is preferably of from 1.5 to 5 $m^2/s$, most preferably of about 2 to 4.5 $m^2/s$. Such flow conditions and size of the nozzle are able to produce a linear velocity in the order of from 10 to 50 m/sec, most preferably of from 12 to 30 m/sec, for example, of about 18 m/sec.

Therefore, the diluent inlet is so oriented in a direction that is offset relative to the longitudinal median axis 0 of the chamber. More precisely, the direction of the inlet is such that the ratio d/r is comprised between 0.2 and 0.9; where "d" is the orthogonal distance separating the direction of the inlet from the centre axis and "r" is the radius of the chamber at the horizontal level of the inlet (FIG. 3).

The vertical position of the diluent inlet 18 can also be important to ensure a proper distance between it and the liquid. A preferred vertical position "c" of the diluent inlet from the inner edge of the bottom wall is comprised between about 5 and 20 mm, most preferably between 6 to 15 mm.

The diluent inlet is also positioned preferably at a relatively low position relative to the longitudinal dimension "f" of the upward wall 15 so that splashing of liquid or overflow of liquid out of the chamber due the liquid rising up along the surface of wall by the dynamic of the flow, i.e., a centrifugal effect, is prevented. Preferably, the diluent inlet is situated at a distance closer to the base of the bottom wall than to the aperture 17. More preferably, the inlet is situated at about or within in the lower quarter of the chamber (as measured by the height "f" of the upward wall 15).

Importantly, the bottom wall 14 of the chamber comprises means for controlling the delivered flow of the frothed liquid through the device. The general principle lies in that liquid is prevented from too quickly leaving the chamber in order to be able to create a layer of liquid that rises up along the side of the upward wall 15 that can be impacted by the jet of diluent and consequently for creating a high amount of shear. FIG. 2 materializes, for example, the surfaces 19 of the liquid in circulation due to the centrifugal effect promoted by the jet on the liquid in the chamber.

The flow control means are therefore obtained by a control of the size and configuration of the delivery outlet(s).

Figure 5:
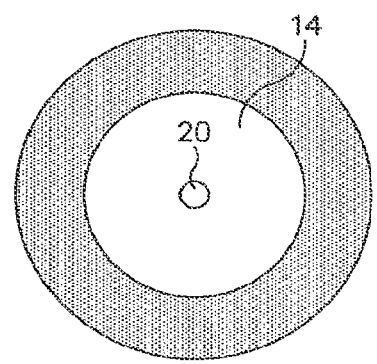
FIG. 5 is a transversal cross sectional view along plane C of FIG. 2.

In the mode of FIG. 5, a single liquid outlet 20 is configured in the bottom wall. The surface area of the single outlet is preferably comprised between 0.8 and 12.6 mm$^2$.

Figure 6:
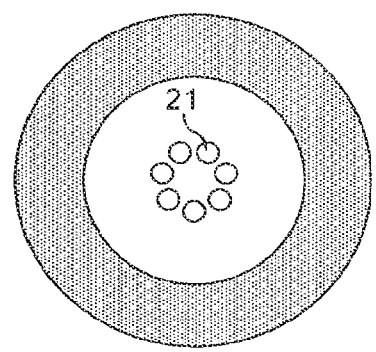
FIG. 6 is a transversal cross sectional view along plane C of FIG. 2 according to a first variant of the device of FIG. 5.

In the mode of FIG. 6, a plurality of outlets 21 are provided, preferably, between 2 and 15, most preferably between 7 and 12, with an individual surface area of each outlet comprised between about 0.28 and 1.5 mm$^2$.

Due to the combination of the centrifugal effect and small outlets, liquid is forced to accumulate in the chamber and it tends to rise up along the upward wall of the chamber as long as the diluent is introduced in the chamber via the inlet at high velocity. On the other hand, the device is self-draining in that liquid can fully exit the chamber via the outlets without substantially any solid or froth residue being left in the device. Rinsing of the chamber may be carried out by diluent being sent via the nozzle in the chamber either continuously or intermittently, e.g., by pulsing diluent in the chamber. The chamber can also be totally removed from the device to be cleaned.

The shape of the bottom wall 14 can be conical so that spreading of the layer of liquid is promoted. The angle "j" of the cone of the bottom wall, relative to a plane transversal to 0, can vary of from 1 to 45 degrees. Of course, the bottom wall could be rounded or flat as well.

Figure 4:
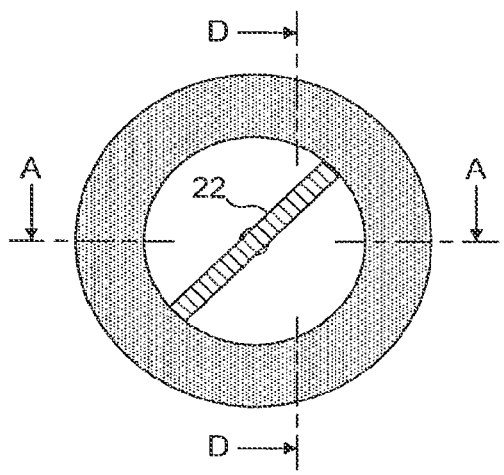
FIG. 4 is a transversal cross sectional view along plane B of FIG. 2.

FIG. 4 shows the presence of a baffle 22 in chamber whose function is primarily to break the circulating flow of the liquid in the chamber above the diluent inlet. As a result, the liquid is prevented from flowing over the chamber through the upper air and dosing opening 17. The baffle can be a single wall crossing the chamber as illustrated. The baffle forms a wall positioned substantially parallel or aligned with the longitudinal axis 0.

Therefore, the baffle is substantially vertical in a normal use of the device. The dimension of the baffle depends on the geometry and size of the chamber. In a preferred example, the baffle has a height H of from 10 to 30 mm, a length equal to the diameter of the chamber, for instance, of from 20 and 31 mm and a thickness of from about 1 to 2 mm. A vertical baffle as represented provided good results with powder having a relatively low ability to stick to walls of the device in humid conditions such as agglomerated powder of coffee or milk. With non-agglomerated powder, less good results were noticed because some powder would tend to stick to the baffle when falling into the device.

Figure 7:
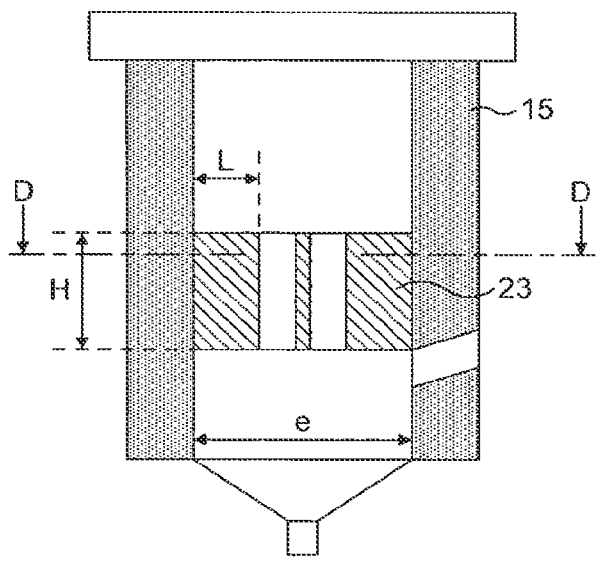
FIG. 7 is a cross sectional view along a longitudinal plane passing through the diluent inlet according to a second variant of the device FIG. 2.
Figure 8:
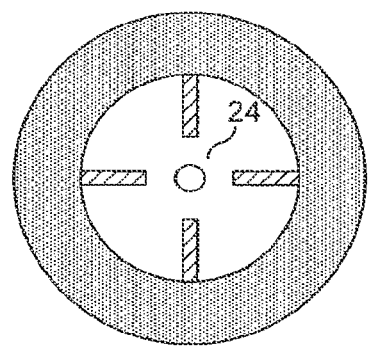
FIG. 8 is a cross sectional view along plane D of FIG. 7.

FIGS. 7 and 8 show a mode in which the baffle means is divided into a plurality of baffles, e.g., four baffles 23 distributed in the upward wall. The baffles are portions of walls running substantially parallel to the longitudinal axis which extend radially only partially across the chamber leaving a central passage 24. Preferably, the baffles extend a transversal projected distance from the inner surface of the chamber which is between 0.1 to 0.5 the value of the radius of the chamber. Therefore, a central passage 24 is provided which benefit is that powder can be dosed in the centre of the chamber from the dosing opening 17 while limiting the chance for the powder to stick on the surfaces of the baffle when falling by gravity in the device. In particular good results were obtained with non-agglomerated powder of coffee or coffee mixes. In a possible non-limiting example, the baffles have a height H of from 10 to 30 mm and a length L of about 5 mm to half the internal diameter "e" of the chamber. The baffles can be in a number of from 2 to 6 evenly and radially distributed in the chamber from the wall 15. In the figure, four baffles are provided which are evenly spaced at 90 degrees.

Figure 9:
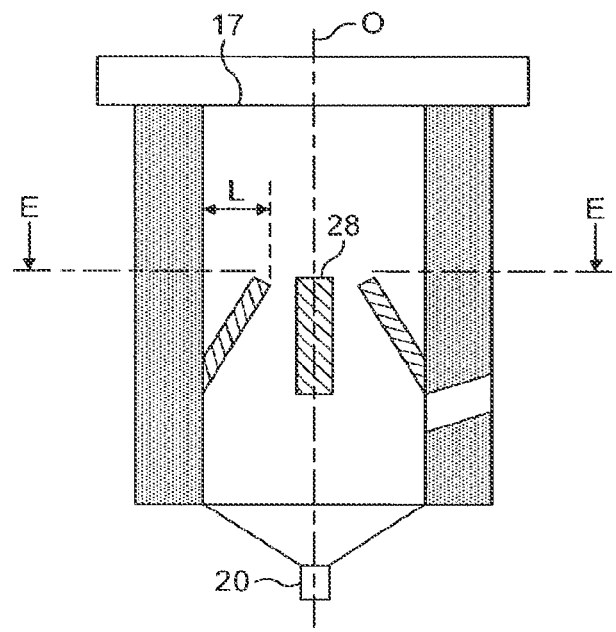
FIG. 9 is a cross sectional view along a longitudinal plane passing through the diluent inlet according to third variant of the device of FIG. 2.
Figure 10:
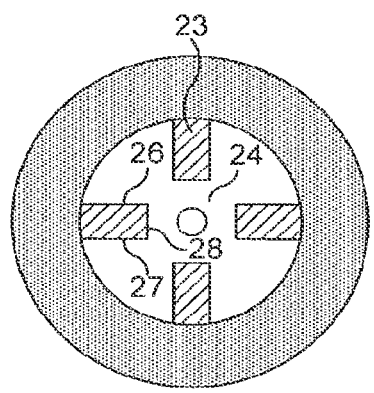
FIG. 10 is a cross sectional view along plane E of FIG. 7.
Figure 11:
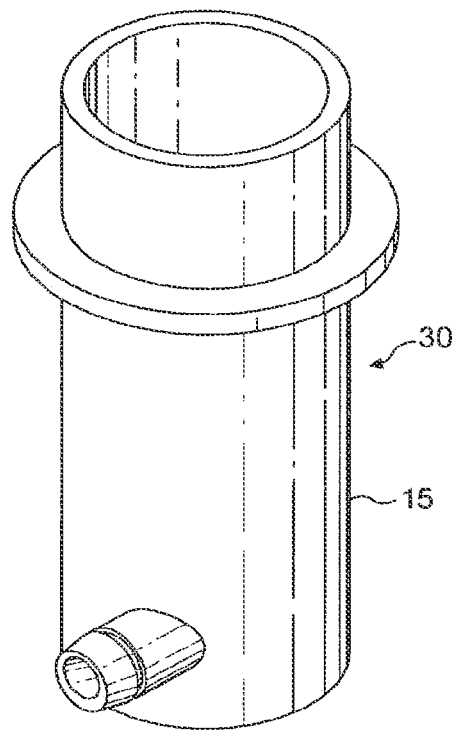
FIG. 11 is a perspective view of an upper part of the device according to a fourth embodiment.
Figure 12:
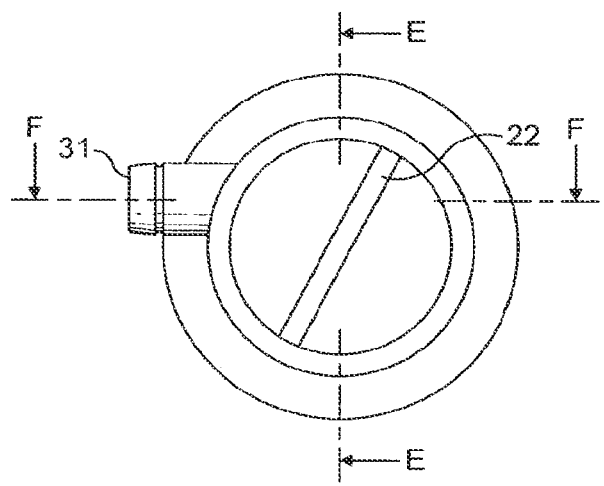
FIG. 12 is a bottom view of the part of device of FIG. 11.
Figure 13:
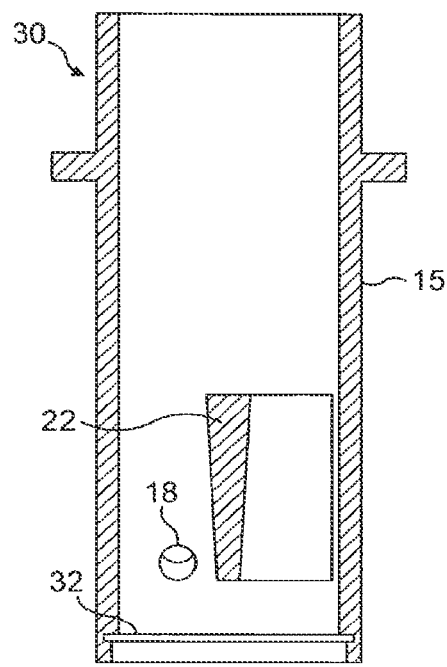
FIG. 13 is a longitudinal view along line E-E of FIG. 12.
Figure 14:
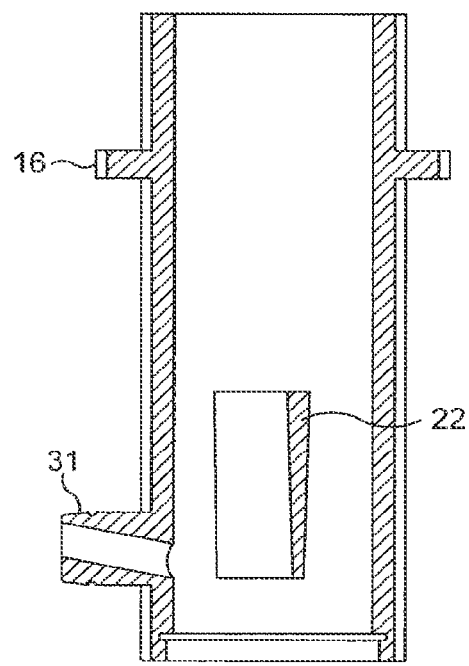
FIG. 14 is a longitudinal view along line F-F of FIG. 12.
Figure 15:
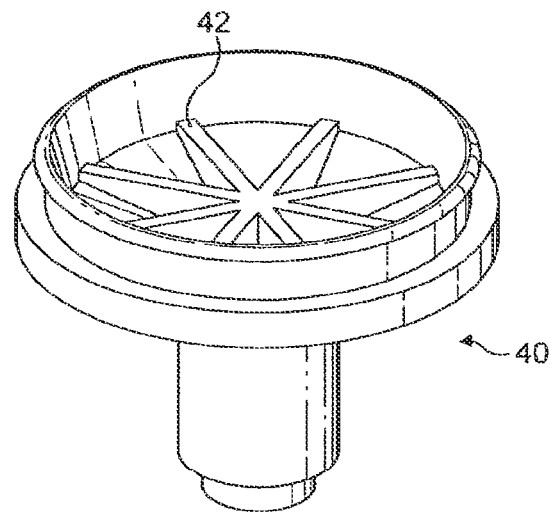
FIG. 15 is a perspective view of the bottom part of the device of FIG. 11.
Figure 16:
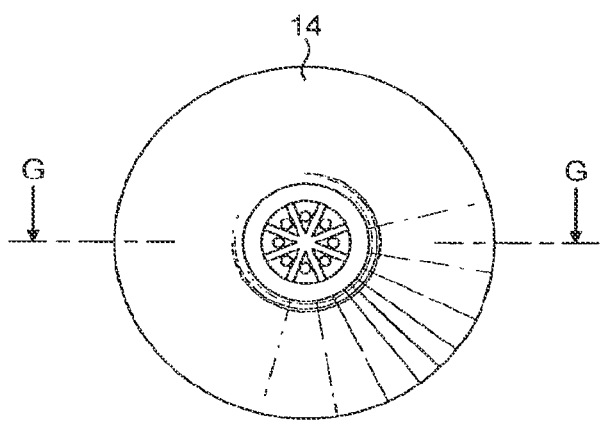
FIG. 16 is a bottom view of the bottom part of FIG. 15.
Figure 17:
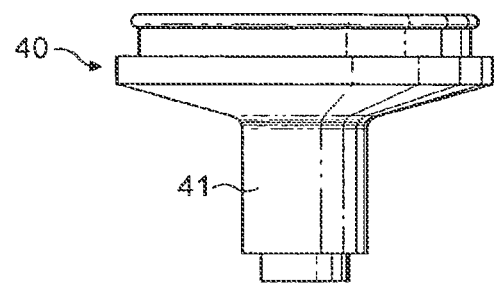
FIG. 17 is a side view of the bottom part of FIG. 15.
Figure 18:
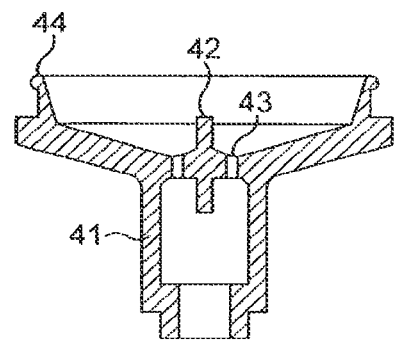
FIG. 18 is a cross section view of the bottom part along G-G of FIG. 16.
Figure 19:
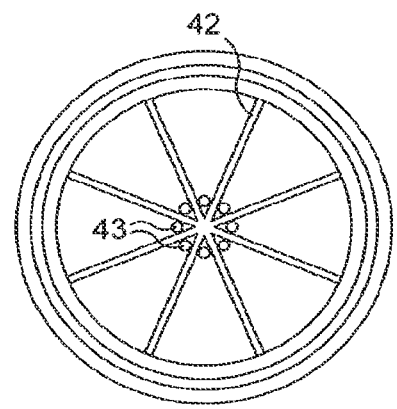
FIG. 19 is an inner view of the bottom part of FIG. 15.

FIGS. 9 and 10 show another variant with baffles 23 forming portions of walls inclined relatively to the longitudinal central axis 0. The baffles are inclined relative to the horizontal and their free ends 28 are directed in the direction of the opening 17 or upwardly. The baffle can extend inwardly of a distance between a value of about 5 mm and the value of the radius of the chamber. Preferably, the baffles extend a transversal projected distance L from the inner surface of the chamber which is between 0.1 to 0.5 time the value of the radius of the chamber. The baffles can also be oriented in transversal inclination in a manner that their side edges 26, 27 are at different heights relative to each other. In an alternative, the side edges 26, 27 could be at the same height relative to each other. In particular good results were obtained with non-agglomerated powder of coffee or coffee mixes.

In an alternative, the baffles can cross each other while leaving certain gaps for air and powder to enter the chamber from air and dosing opening 17.

Of course, the baffles could take various shapes that significantly differ from portions of flat walls. They could be pins, needles, a grid or portions of grid or curved walls, an helical wall or annular wall or a star shaped wall.

FIGS. 11 to 19 illustrate a possible construction of the device of the invention in two assembled parts. A first upper part 30 is illustrated by FIGS. 11 to 14. A second lower part 40 is illustrated by FIGS. 15 to 19. The two parts can be produced by plastic injection moulding and assembled by press-fitting, with or without a sealing member in-between, or be eventually welded or glued for providing a liquid tight assembly.

The upper part takes a single piece of tubular shape forming the upward wall 15 of the device. The diluent inlet 18 extends from the upward wall by a connection portion 31 enabling an easy and rapid coupling with the diluent flexible line of the beverage production apparatus 1 of FIG. 1. A baffle 22 can be provided in the chamber that is also moulded as one integral piece with the tubular upper portion 30. In the lower end of the part 30 is provided a press-fit type connection 32 such as annular inner groove. The connection 32 is so designed to complementary fit a complementary press-fitting connection of the lower part 40 of the device as shown in FIGS. 15 to 19.

The lower part 40 forms the conical bottom wall and an outlet portion 41 of the device. The outlet portion can be formed as a tubular portion of reduced section that extends from the centre of the conical wall for guiding the flow of liquid exiting the device. In the inside of the lower part, a plurality of small wings 42 converging to the inner centre of the wall can be made to slow down the speed of the liquid before it exists through the outlet portion. A series of small outlets 43 are distributed along a small circular path just around the centre of the bottom wall. The outlets, for instance eight outlets, are preferably located no more than a distance of about 0.5 mm from the centre between each of the small wings. The diameter of each outlet is of about 0.8 to 1.1 mm. At the upper periphery of the conical portion, a small resilient flange 44 extends upwards to form with a locking protrusion of the complementary press-fitting connection of the device. This lower part can be moulded in plastic and press fitted directly to the upper part to form the device of the invention.

Figure 20:
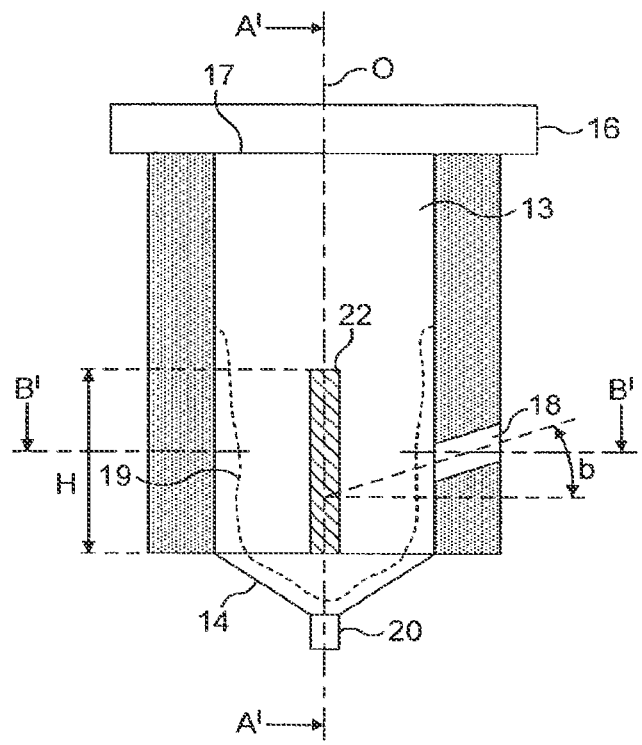
FIG. 20 is a cross sectional view along a longitudinal plane D passing through the diluent inlet (plane D is illustrated on FIG. 22)
Figure 21:
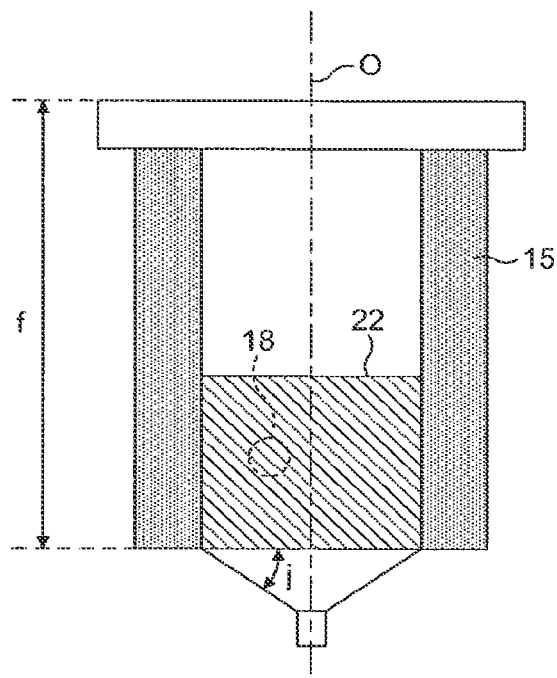
FIG. 21 is another longitudinal cross sectional view along a longitudinal plane A of FIG. 20.
Figure 22:
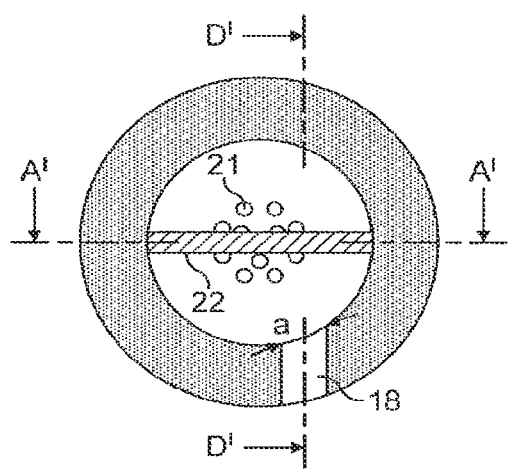
FIG. 22 is a transversal cross sectional view along plane B of FIG. 20.

FIGS. 20 and 21 are equivalent to FIGS. 2 and 3 except that the baffle 22 are a sieve placed across the chamber and that sieve faces the diluent inlet 18. The sieve extends over all the inferior part of the chamber 13 so that the diluent jet emerging from the diluent inlet 18 hits and passes across the sieve 22. As illustrated in FIG. 22, the longitudinal plane of the sieve 22 is perpendicular to the horizontal projection of the diluent inlet axis. Several outlets 21 are provided at the bottom of the chamber.

The sieve 22 in chamber aims at breaking the circulating flow of the liquid in the chamber above the diluent inlet and preventing the liquid from flowing over the chamber through the upper air and dosing opening 17. The sieve 22 aims too at improving the dissolution of the soluble powder ingredients in the diluent and foaming the liquid. The range of chamber and baffle dimensions given in the description of FIGS. 2 to 4 are identical for FIGS. 20 to 22.

Figure 23:
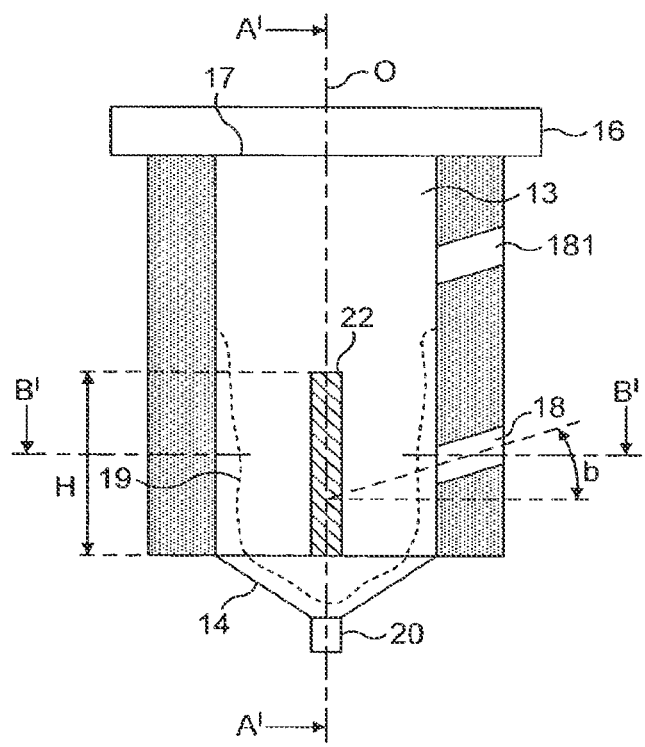
FIG. 23 is a cross sectional view along a longitudinal plane passing through two diluent inlets.
Figure 24:
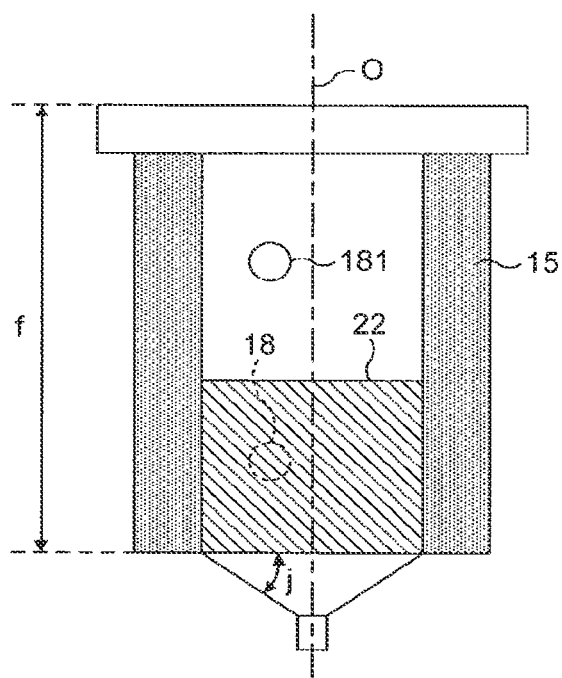
FIG. 24 is another longitudinal cross sectional view along another longitudinal plane of FIG. 23.

FIGS. 23 and 24 are equivalent to FIGS. 20 and 21 except that the chamber comprises a second diluent inlet 181 placed above the first diluent inlet 18 and above the sieve 22. The second inlet 181 is sized and oriented in a manner to promote both centrifugal circulation of the liquid and shearing on the surfaces of the liquid. In use, diluent is introduced either through the first inlet or the second inlet depending if the desired beverage is a beverage with a lot of foam, like espresso type coffee, or with no or few foam, like filter type or American type coffee. If a beverage with high foam is desired, then the diluent is only injected through the diluent inlet facing the sieve. If a beverage with less or no foam is desired, then the diluent is only injected through the second diluent inlet that does not face the sieve.

Back to FIG. 1, the operation of the beverage production apparatus of the invention can be described in an example that follows. A user presses a button of command 12 to activate the apparatus. The controller 11 receives the order from the command 12 and drives the dosing unit 4 according to the choice made by the user. The dosing unit will meter a certain amount of soluble ingredient from the reservoir 3; such amount being delivered in the frothing device of the invention through its upper opening. The soluble ingredient can be agglomerated or non-agglomerated coffee powder for instance. The powder falls by gravity in the bottom of the chamber, preferably, right through the central passage between the baffles in particular when powder has a tendency to stick to walls or baffles (e.g., non-agglomerated coffee powder). Once the powder is in the device, the controller 6 turns the pump on and eventually the heater too if hot water is required. Water mixes with the powder and frothed liquid is so produced. Water can be dosed in a volume of between 25 to 250 m². Preferably, for small coffees, 40 or 70 ml² of water is dosed in one continuous jet. The controller can stop the pump at regular intervals to let the frothed liquid drain, in particular, for larger volumes. Then, the controller turns the pump off. If necessary, the controller further turns the pump on again for delivering a small rinsing water volume to provide the rinsing step. In an alternative, the rinsing step is carried out continuously by a single jet when producing the frothed liquid.

One advantage of the invention is the ability to efficiently dissolve and provide a high quality frothed liquid such as coffee with a thick and homogeneous crema using soluble ingredient as starting material and which is comparable in quality to roast-and-ground coffee beverages such as espresso or lungo. However, the invention does not have the disadvantages of leaving solid residue in the device or cartridge, nor it has the one of generating potential packaging waste. The invention is of convenient use because it can be automated easily and can serve both for a use in small beverage appliances or in high throughput beverage production devices such as "barista" type machines. Moreover, it does not require the use of a high pressure diluent pump: a pump providing diluent with a pressure of 4 to 5 bars is sufficient.

The above embodiments have been described by way of example only. Many other embodiments falling within the scope of the accompanying claims will be apparent to the skilled reader.

The invention is claimed as follows:

1. A device for producing a frothed liquid comprising:
a cylindrically shaped chamber opened to the atmosphere and comprising a transverse bottom wall, a longitudinal upward wall, a first diluent inlet, and at least one liquid delivery outlet, the first diluent inlet extends through a lower portion of the upward wall and is inclined downwardly in direction toward the bottom wall at an angle (b) relative to a transversal plane of the chamber to direct a jet of diluent into the chamber, and the liquid delivery outlet is located in the bottom wall for enabling liquid to rise up along the side of the upward wall by the jet of diluent entering the chamber,
wherein the first diluent inlet is oriented in a direction so that a ratio of a distance "d" to the radius "r" of the chamber is between 0.2 and 0.9, and wherein "d" is a distance measured orthogonally from a direction of orientation of the first diluent inlet to a central axis of the chamber.

2. The device of claim 1, wherein the total surface area of the liquid delivery outlet is configured so that the evacuation flow rate by gravity of the liquid through the outlet is lower than the filling flow rate of the chamber in diluent through the first diluent inlet.

3. The device of claim 1, wherein a single liquid delivery outlet is provided in the bottom wall, the single liquid delivery outlet having a cross section smaller than 12.6 mm².

4. The device of claim 1, comprising a plurality of liquid delivery outlets provided in the bottom wall wherein each individual outlet has a cross section smaller than 1.52 mm².

5. The device of claim 1, wherein the liquid delivery outlet is provided in the center of the bottom wall.

6. The device of claim 1, wherein the bottom wall comprises at least one liquid delivery outlet closed by an openable valve using external control means for delaying the liquid delivery from the outlet.

7. The device of claim 1, wherein the first diluent inlet has a diameter between 0.2 and 1 mm.

8. The device of claim 1, wherein the chamber comprises a conduit placed at the top of the chamber, the conduit providing a liquid outlet allowing liquid to exit the chamber after the liquid has exceeded the chamber capacity.

9. The device of claim 1, wherein the device forms a disposable or recyclable cartridge which contains an amount of soluble ingredient.

10. The device of claim 1, wherein the first diluent inlet is hermetically closed by at least one airtight removable membrane.

11. The device of claim 1, wherein the angle (b) relative to the transversal plane of the chamber is between 5 and 30 degrees.

12. The device of claim 1, wherein the chamber comprises a second diluent inlet positioned at a different height of the upward wall relative to the first diluent inlet, the second diluent inlet having a characteristic selected from the group consisting of an orientation different from that of the first diluent inlet, a dimension different than that of the first diluent inlet, and combinations thereof.

13. A beverage production apparatus comprising:
a device for producing a frothed liquid comprising an opened, cylindrically shaped chamber comprising a transverse bottom wall, a longitudinal upward wall, a first diluent inlet, at least one liquid delivery outlet, and a diluent feed means connectable to the first diluent inlet, the first diluent inlet extends through the upward wall and is inclined downwardly in a direction toward the bottom wall at an angle (b) relative to a transversal plane of the chamber to direct a jet of diluent into the chamber, and the liquid delivery outlet is located in the bottom wall for enabling liquid to rise up along the side of the upward wall by the jet of diluent entering the chamber, wherein the first diluent inlet is oriented in a direction so that a ratio of a distance "d" to the radius "r" of the chamber is between 0.2 and 0.9, and wherein "d" is a distance measured orthogonally from a direction of orientation of the first diluent inlet to a central axis of the chamber.

14. The apparatus of claim 13, wherein the chamber comprises a second diluent inlet positioned at a different height of the upward wall relative to the first diluent inlet, the second diluent inlet having a characteristic selected from the group consisting of an orientation different from that of the first diluent inlet, a dimension different than that of the first diluent inlet, and combinations thereof.

15. The apparatus of claim 13, comprising a liquid reservoir that supplies the diluent.

16. The apparatus of claim 15, comprising a water pump configured to transport the diluent from the liquid reservoir to a water heating system.

17. The apparatus of claim 16, wherein the diluent feed means comprises a tube that feeds the diluent from the water heating system to the device.

18. The apparatus of claim 13, comprising a soluble ingredient reservoir positioned above the device.

19. The apparatus of claim 13, comprising a dosing system coupled to the soluble ingredient reservoir and configured to meter doses of the soluble ingredient from the soluble ingredient reservoir into the device.

* * * * *